(12) United States Patent
McDorman et al.

(10) Patent No.: US 11,438,342 B2
(45) Date of Patent: Sep. 6, 2022

(54) LOCATION-BASED IDENTITY AUTHENTICATION (LIA) SYSTEM

(71) Applicant: T-Mobile USA, Inc., Bellevue, WA (US)

(72) Inventors: Douglas McDorman, Sammamish, WA (US); Michael Engan, Bellevue, WA (US); Ahmad Arash Obaidi, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 281 days.

(21) Appl. No.: 16/827,436

(22) Filed: Mar. 23, 2020

(65) Prior Publication Data

US 2021/0297422 A1 Sep. 23, 2021

(51) Int. Cl.
*H04L 9/40* (2022.01)
*H04L 41/22* (2022.01)
*H04L 9/32* (2006.01)

(52) U.S. Cl.
CPC .......... *H04L 63/107* (2013.01); *H04L 9/3271* (2013.01); *H04L 41/22* (2013.01); *H04L 63/0876* (2013.01)

(58) Field of Classification Search
CPC ... H04L 63/107; H04L 63/0876; H04L 41/16; H04L 41/22; H04L 43/065; H04L 43/067; H03L 9/3271; H04W 12/63; H04W 12/084
See application file for complete search history.

(56) References Cited

U.S. PATENT DOCUMENTS

| | | | | |
|---|---|---|---|---|
| 9,078,129 | B1 * | 7/2015 | Dotan | H04W 12/06 |
| 9,131,374 | B1 * | 9/2015 | Avni | H04W 12/30 |
| 9,633,322 | B1 * | 4/2017 | Burger | G06Q 20/405 |
| 9,888,377 | B1 * | 2/2018 | McCorkendale | H04W 12/06 |

(Continued)

OTHER PUBLICATIONS

Y. Albayram, M. M. H. Khan, A. Bamis, S. Kentros, N. Nguyen and R. Jiang, "A Location-Based Authentication System Leveraging Smartphones," 2014 IEEE 15th International Conference on Mobile Data Management, 2014, pp. 83-88, doi: 10.1109/MDM.2014.16. (Year: 2014).*

(Continued)

*Primary Examiner* — Robert B Leung
(74) *Attorney, Agent, or Firm* — Han Santos, PLLC

(57) ABSTRACT

This disclosure describes techniques that permit a user of a client device to authenticate their identity to a service provider using location-based telemetry data associated with the client device that is captured unobtrusively by a service provider over a predetermined time interval. More specifically, a Location-based identity authentication (LIA) system is described that is configured to develop authentication challenges that are based on the location-based telemetry data, such as location data, transaction data, calendar data, and event data. In one example, a client device may transmit an authentication request that relates to a set of service features available to a user identity. The LIA system may transmit a subset of the authentication challenges to the client device to authenticate the user identity. The LIA system may further receive to the subset of authentication challenges, and further, verify the user identity based at least in part on the number of correct responses.

20 Claims, 6 Drawing Sheets

(56) References Cited

U.S. PATENT DOCUMENTS

| | | | | |
|---|---|---|---|---|
| 9,955,349 | B1* | 4/2018 | McClintock | H04L 63/083 |
| 10,572,653 | B1* | 2/2020 | Semichev | G06Q 20/4014 |
| 2008/0146193 | A1* | 6/2008 | Bentley | H04L 63/107 |
| | | | | 455/411 |
| 2013/0007864 | A1* | 1/2013 | Puflea | G06F 21/33 |
| | | | | 726/7 |
| 2014/0082713 | A1* | 3/2014 | Markel | H04L 63/105 |
| | | | | 726/7 |
| 2014/0137219 | A1* | 5/2014 | Castro | H04L 67/02 |
| | | | | 726/6 |
| 2014/0189829 | A1* | 7/2014 | McLachlan | H04L 63/08 |
| | | | | 726/6 |
| 2017/0048230 | A1* | 2/2017 | Johansson | H04L 9/3271 |
| 2017/0053280 | A1* | 2/2017 | Lishok | G06Q 20/3224 |
| 2018/0084423 | A1* | 3/2018 | Bender | G06F 21/316 |

OTHER PUBLICATIONS

F. Nisar, "Location based Authentication Service using 4G/5G Devices," 2019 International Conference on Communication Technologies (ComTech), Mar. 2019, pp. 120-126, doi: 10.1109/COMTECH.2019.8737834. (Year: 2019).*

Y. Albayram, M. M. H. Khan, A. Bamis, S. Kentros, N. Nguyen and R. Jiang, "Designing challenge questions for location-based authentication systems: a real-life study." Human-centric Computing and Information Sciences 5.1 (2015): 1-28. (Year: 2015).*

\* cited by examiner

LOCATION-BASED IDENTITY AUTHENTICATION (LIA) SYSTEM

BACKGROUND

Present day, a vast majority of internet-based applications are accessible using authentication tokens as a means of authenticating an identity of a user associated with an access request. The use of authentication tokens allows a user to access multiple secure servers that host web applications after a single login, rather than the user having to individually log into each secure server. This form of token-based authentication is performed in lieu of manually inputting client sign-on credentials, e.g., username and password, for verification by a service provider. Following validation of the authentication token, the service provider may grant the application or application access to the secure service.

The authentication tokens described above are known as bearer tokens, which means that any actor may use the authentication token to obtain a secure service. Typically, secure service providers do not take any additional authentication steps to verify that the authentication token is being presented by a user to whom the authentication was originally issued. As a result, authentications tokens are susceptible to being stolen and used by malicious actors to gain unauthorized access to a secure server.

Hardware tokens are another exemplary authentication method that improves upon the security of client sign-on credentials. Hardware tokens have been burdened with low affordability and complex lost-device recovery mechanisms, resulting in low adoption rate.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
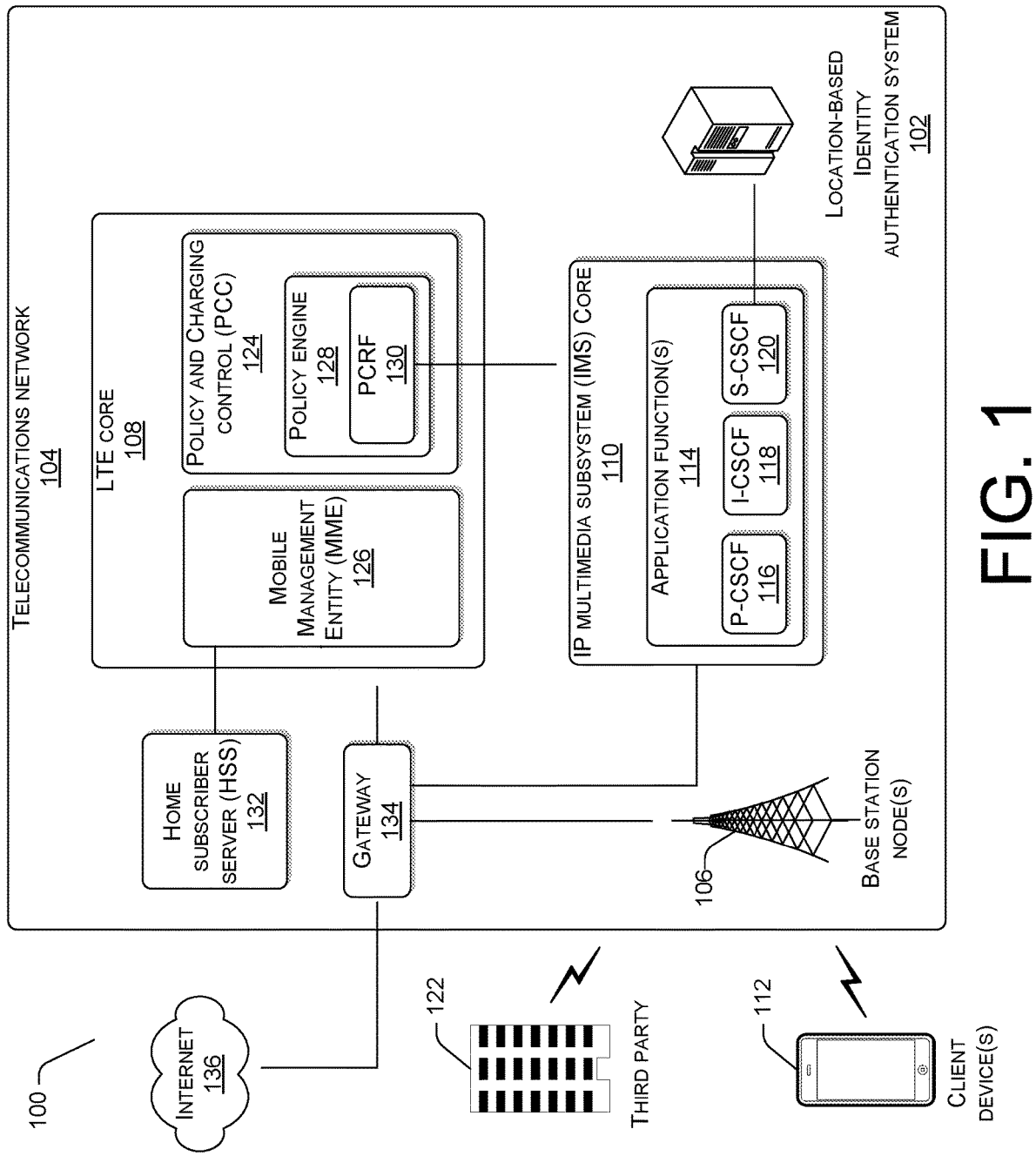
FIG. 1 illustrates a schematic view of a computing environment that facilitates the operation of a Location-based Identity Authentication (LIA) system within a telecommunications network.

This disclosure describes techniques that facilitate the use of location-based telemetry data to authenticate a user identity associated with a client device. Typically, a user of a client device may authenticate their identity to a service provider using a username and password combination, or some other knowledge-based authentication schema, such as a mother's maiden name, etc. However, such authentication schema are prone to tampering by malicious actors and are no longer considered robust proofing methods. Hardware tokens provide a more robust proofing method over the former, but lack affordability. This disclosure describes techniques that permit a user of a client device to authenticate their identity to a service provider using location-based telemetry data associated with the client device. The location-based telemetry data may be captured unobtrusively by a service provider over a predetermined time interval. The location-based telemetry data is intended to capture information about a user, that is specific to the user, but at the same time, not traditionally known or captured as part of a user profile. For example, a user may frequent a merchant store (i.e. coffee store) on particular days of the week and at particular times of the day. Additionally, or alternately, the user may partake in social or recreational activities at particular locations (i.e. running track, gymnasium, recreational park, etc.) on particular days of the week and at particular times of the day. In each of these examples, the location-base telemetry data may capture such information for use in forming an unintuitive proofing method.

In various examples, location-based telemetry data may relate to places of interest and/or events visited by a user over a predetermined time interval. Non-limiting examples may include geolocations visited by the client device, multimedia captured at the visited geolocations, transactions initiated via the client device at visited geolocations, weather conditions at the visited geolocations at the visited point-in-time, events taking place at the visited geolocation at the visited point-in-time, and/or any other information pertinent to a visited geolocation and/or client device. In the above examples, the location-based telemetry reflects telemetry data associated with the visited location captured at a visited point-in-time. In other examples, the location-based telemetry may reflect other information pertinent to the visited geolocation such as recent news-worthy events, recent weather conditions, etc.

In one example, the location-based telemetry data may be captured via a location-based telemetry application that resides on the client device or via the telecommunication network (i.e. carrier-based location information rather than device-based GPS sensor data). The location-based telemetry application may be configured to monitor, store, and/or process location-based telemetry data, in situ, on a continuous basis or per a predetermined schedule. The predetermined schedule may correspond to a time interval of 30 minutes, one hour, or six hours. Any time interval is possible.

Further, the location-based telemetry application may be configured to capture sensor data from sensors of the client device that reside on the client device. The sensor data may be used to generate the location-based telemetry data. The sensor data may include, geolocation (i.e. GPS sensor), weather conditions (i.e. temperature sensor), noise pollution (i.e. microphone), user kinematic movement (i.e. accelerometers), and/or so forth. Kinematic movements may include determining whether the user is walking, running, cycling or in a moving vehicle, or running. In various examples, the location-based telemetry data may be associated with the time of day and day of the week, to which it was captured.

The location-based telemetry application may interact with third-party applications that reside on the client device or that are accessible via the client device. Third-party applications may provide location-based telemetry data that includes weather data, event data, user-specific calendar data, user-specific contacts data, and/or so forth. In one example, a user may initiate a phone call at a geolocation. In doing so, the location-based telemetry application may capture an identity of the phone call recipient from user-specific contacts data within a third-party address book application. In another example, the location-based telemetry application may cross-reference the day and time that a user visits a geolocation with user-specific calendar data, within a third-party calendar application, to give context to the visit (i.e. scheduled appointment, etc.) or determine with whom the user is visiting the geolocation.

The location-based telemetry application may transmit the location-based telemetry data to a Location-based identity authentication (LIA) system that is configured to generate authentication challenges intended to verify a user identity associated with the client device. Since the authentication challenges are based on an atypical knowledge base of the user, developed from location-based telemetry data unobtrusively captured from the client device while the user goes about their typical activities, the authentication challenges themselves may be less prone to tamper relative to traditional authentication schema. By way of example, an authentication challenge may ask the user to identify a third-party with whom they conducted a voice communication (i.e. phone call) at a geolocation at a particular point in time, an event or landmark visited at the geolocation a particular point in time, or a weather condition or noise pollution experienced at the geolocation a particular point in time.

In one non-limiting example, the LIA system may be incorporated as part of a service provider's infrastructure and used to authenticate user identities (i.e. subscriber identity) associated with the service provider. Consider a scenario whereby a user loses their client device and attempts to authenticate their identity to a telecommunications service provider, using another client device. In this example, the LIA system may generate a series of authentication challenges based on the knowledge base of location-based telemetry data captured from the user over time. A first authentication challenge may ask the client to drop a pin to mark their location at a past time of day or day of the week. A second authentication challenge may ask the client to select from a number of multiple options, a narrative that best describes the purpose for their visit to the geolocation.

The LIA system may generate an assurance score based on responses to the authentication challenges. In one example, the assurance score may be configured as a binary measure of correct and incorrect responses. Each correct response may receive a positive assurance score and each incorrect response, a null or negative assurance score. In another example, the assurance score for each correct response may vary based on the complexity of the question/response. For example, an authentication challenge to drop a pin on a map to identify a geolocation at a past point in time may be considered a more robust authentication measure relative to a user selection of a narrative that best describes a purpose for a past visit to a geolocation.

The LIA system may aggregate assurance scores across the number of authentication challenge questions presented to the user. In this way, an aggregate assurance score may be developed and compared to a predetermined assurance threshold. If the aggregate assurance score is greater than or equal to the predetermined assurance threshold, the LIA system may grant the user access to the requested platform. However, if the aggregate assurance score is less than the predetermined assurance threshold, the LIA system may infer that a malicious actor is feigning the user identity, and in doing so, deny the user access to the requested platform.

In another non-limiting example, the LIA system may be utilized by a third-party service provider that is attempting to authenticate a user identity associated with a service provider. Consider a scenario in which a financial institution, as the third-party service provider, is attempting to authenticate a user identity associated with a telecommunications service provider. The user may attempt to transact funds from an Automatic Telling Machine (ATM) using an authorized card. The financial institution may recognize the authorized card and may further recognize a preestablished association between the authorized card and the telecommunications service provider.

Further, the financial institution may request, from the LIA system of the telecommunications service provider, a series of authentication challenges to verify an identity of the user attempting to draw funds. The financial institution may also provide a required authentication level based on the nature of the transaction (i.e. a withdrawal of funds, a deposit of funds, etc.). In response, the LIA system may generate a series of authentication challenges for delivery to the financial institution. The financial institution may display the authentication challenges on a screen accessible by the user (i.e. ATM). Additionally, or alternatively, the authentication challenges may be audibly delivered to the user via a speaker of the ATM, or immediately proximate to the ATM. Responses may be captured via a microphone or via a touchscreen facility of the ATM. In another embodiment, an authentication challenge may request the user present visual data captured at a point in time at a particular geolocation. Visual data may correspond to an image captured by the client device at the particular point in time at the particular geolocation. The response from the user (i.e. a showing of the image stored on the client device or accessible via the client device) may be captured via a camera at the ATM and used as a response to the authentication challenge.

Moreover, the financial institution may transmit the user responses to the authentication challenges to the LIA system, and in doing so, receive a message from the LIA system that indicates whether the user identity has been verified to the authentication level required by the financial institution.

The LIA system may develop authentication challenges to verify user identity for various platforms, such as a client device platform, telecommunication service accounts, vendor service accounts, or specific user applications. Each platform may require different levels of authentication based on the nature of proprietary data accessed within the platform. A gaming application may require a lower authentication level relative to a telecommunication service account, based on the lack of personally-identifiable data accessible via the gaming application relative to the same that is accessible via the telecommunication service account. Accordingly, the LIA system may correlate each authentication level with a predetermined assurance threshold and assign one or more authentication challenges, of varying complexity to an access request based on the predetermined assurance threshold of the platform.

Further, the term "techniques," as used herein, may refer to system(s), method(s), computer-readable instruction(s), module(s), algorithms, hardware logic, and/or operation(s) as permitted by the context described above and through the document.

FIG. 1 illustrates a schematic view of a computing environment 100 that facilitates operation of a Location-based identity authentication (LIA) system 102 within a telecommunications network 104. In FIG. 1, the telecommunications network 104 corresponds to a Long-Term Evolution (LTE) network, however further variations and modifications can be made such that the LIA system 102 is executable on a 5G-New Radio (5G-NR), 2G or 3G telecommunications network, or any other communications protocol including Wi-Fi. The computing environment 100 may include base station node(s) 106, an LTE core 108, and an Internet Protocol Multimedia Subsystem (IMS) core 110. The base station node(s) 106 are responsible for handling voice and data traffic via air interfaces between the LTE core 108 and client devices, such as client device(s) 112. The LTE core 108 may provide telecommunication and data communication services to multiple client devices, such as an LTE-compatible client device, collectively referred to as client device(s) 112.

The client device(s) 112 may include any sort of electronic device, such as a cellular phone, a smartphone, a tablet computer, an electronic reader, a media player, a gaming device, a personal computer (PC), a laptop computer, etc. The client device(s) 112 may include a subscriber identity module (SIM), such as an eSIM, to identify the client device(s) 112 to a telecommunication service provider network (also referred to herein, as "telecommunication network").

In various examples, an IMS core 110 may reside within the first telecommunications network 104. The LTE core 110 may include application function(s) (AF) 114, such as a Proxy Call Session Control Function (P-CSCF) 116, an Interrogating Call Session Control Function (I-CSCF) 118, and a Serving Call Session Control Function (S-CSCF) 120. The P-CSCF 116 behaves like a proxy by accepting requests and serving them internally or forwarding them towards to the I-CSCF 118 and S-CSCF 120. The S-CSCF 120 acts as a Session Initiation Protocol (SIP) registrar and in some cases as an SIP redirect server. The S-CSCF 120 is responsible for processing the location registration of a client device, client authentication, and call routing and processing. The I-CSCF 118 is tasked with selecting an S-CSCF 120 for serving an initial SIP request, particularly when a client device initiating the request does not know which S-CSCF 120 should receive the request.

In the illustrated example, the LIA system 102 may interact with the S-CSCF 120 to capture location-based telemetry data from a client device(s) 112(1) and further generate authentication challenges intended to verify a user identity associated with the client device(s) 112(1). Specifically, the LIA system 102 may receive an authentication request from another client device(s) 112(2) or a third-party 122 that relates to access of a set of service features associated with the client device(s) 112(1). In a non-limiting example, a user associated with the client device(s) 112(1) may have lost the client device(s) 112(1) and instead initiated an authentication request using another client device(s) 112(2) or a third-party 122. The set of service features may include an ability to send and receive text, audio, or data communications, along with client profile data and user application data that resides on the first client device. Alternatively, the set of service features may relate to the third-party 122 that initiated the authentication request. For example, the third-party 122 may correspond to a financial institution, and the authentication request may relate to performance of a financial transaction by a user purporting to be a user identity associated with the client device(s) 112(1).

In this example, the LIA system 102 may transmit a set of authentication challenges to the client device(s) 112(2) or third-party 122 that initiated the authentication request and based at least in part on a response to the set of authentication challenges, verify a user identity associated with the client device(s) 112(1).

The LIA system 102 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices, such as client device(s) 112 via one or more network(s).

Additionally, the LTE core 108 may further include a Policy and Charging Control (PCC) 124 and a Mobile Management Entity (MME) 126. The PCC 124 may enable detection of communication service data flow and provide parameters for policy control and/or charging control. In the illustrated example, the PCC 124 may include a policy engine 128, such as a Policy and Charging Rules Function (PCRF) 130. The MME 126 performs signal functions in the LTE core 108. The MME 126 and send and receive signaling information needed to set up a bill, and address calls to the base station node(s) 106 and contains security protocols for authentication and authorization. The MME 126 may access a Home Subscriber Server (HSS) 132 that is configured to authenticate an identity of a client and authorize operation of a corresponding client device(s) 112(1) or client device(s) 112(2) on the telecommunications network 104.

Further, a gateway 134 may interface with the LTE core 110 and the LTE core 108. The gateway 134 may include one or more servers and related components that are tasked with providing connectivity between the LTE core 110, the LTE core 108, the client device(s) 112, the third-party 122, and the internet 136. More specifically, the gateway 134 may act as a point of entry and exit for network traffic into the telecommunications network 104.

Figure 2:
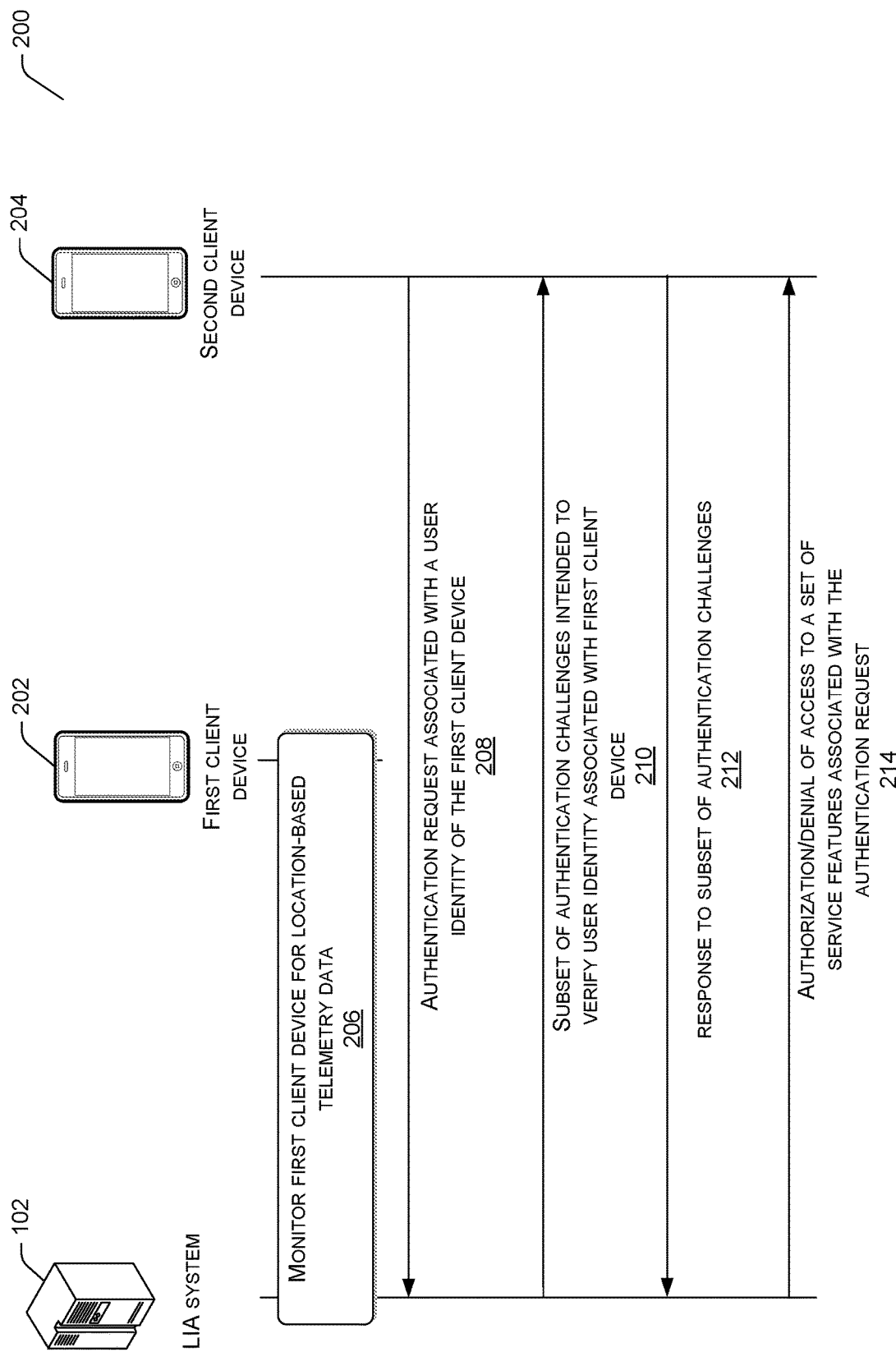
FIG. 2 illustrates a block diagram of a process for an LIA system to authenticate a user identity associated with a first client device via a second client device.

FIG. 2 illustrates a block diagram of a process for an LIA system 102 to authenticate a user identity associated with a first client device 202 via a second client device 204. In this example, a user associated with the first client device 202 may have lost the first client device 202, and as a result, attempted to access a set of service features associated with the first client device 202 via a second client device 204. The set of service features may include an ability to send and receive text, audio, or data communications, along with client profile data and user application data that resides on the first client device 202. The first client device 202 and the second client device 204 may correspond to client device(s) 112.

At block 206, the LIA system 102 may monitor the first client device(s) 112 to capture location-based telemetry data associated with the first client device(s) 112. Location-based telemetry data may be captured from sensors at the first client device(s) 112 or third-party applications that reside on the first client device(s) 112. By way of example, location-based telemetry data captured via sensors may include a geolocation (i.e. GPS sensor), weather conditions (i.e. temperature sensor), noise pollution (i.e. microphone), user kinematic movement (i.e. accelerometers), and/or so forth. Kinematic movements may include determining whether the user is walking, running, cycling or in a moving vehicle, or running. In various examples, the location-based telemetry data may be associated with the time of day and day of the week, to which it was captured. Location-based telemetry data captured from third-party applications may include weather data, event data, user-specific calendar data, user-specific contacts data, and/or so forth.

The LIA system 102 may monitor the first client device(s) 112 on a continuous basis or per a predetermined schedule. The predetermined schedule may correspond to a time interval of 30 minutes, one hour, or six hours. Any time interval is possible.

In response to capturing the location-based telemetry data, the LIA system 102 may generate a set of authentication challenges that are intended to verify a user identity associated with the first client device 202.

In some examples, the LIA system 102 may transmit a message to the first client device(s) 112, via the location-based telemetry application, that requests a selection of one or more geolocations that may be used to generate the set of authentication challenges. For example, the client may be presented with a list of frequented geolocations based on historical geolocation data, and prompted to select one or more geolocations that will be used to generate the set of authentication challenges. In another example, the client may be presented with a map and prompted to drop pin(s) to select the one or more geolocations. Additionally, or alternately, the client may be presented with a text-field and prompted to enter physical addresses that correspond to the one or more geolocations. The benefit of doing so is that the client may add an additional level of complexity to the authentication challenges—reflected in the assurance score of a correct response to an authentication challenge by selecting geolocations that are infrequently visited. Authentication challenges based on infrequently visited geolocations are less prone to correct guesses relative to frequently visited geolocations, by third-parties with only a cursory familiarity of the client.

Accordingly, the location-based telemetry application may be configured to capture location-based telemetry data for the select set of geolocations, as specified by the client, and ignore other visited geolocations. Alternately, the location-based telemetry application may forgo a prompt to the client to select the set of geolocations, and instead unobtrusively generate the set of authentication challenges based on geolocations that are frequently, and/or infrequently visited. In some examples, also, the location-based telemetry application may be configured to receive a selection of geolocations that are not to be used to generate authentication challenges. In other words, a client may proactively generate a blacklist of geolocations that are not to be used in generating authentication challenges. At block 208, the LIA system 102 may receive an authentication request, from a second client device 204. The authentication request may relate to accessing a set of service features associated with the first client device(s) 112. For example, a user associated with the first client device(s) 112 may have lost or misplaced the first client device(s) 112. As a result, the user may attempt to authenticate their identity via the second client device(s) 112.

At block 210, the LIA system 102 may transmit a subset of authentication challenges to the second client device 204. Since the authentication challenges are based on an atypical knowledge base derived from the location-based telemetry data, the authentication challenges themselves may be less prone to tamper relative to traditional authentication schema. By way of example, an authentication challenge may ask the user to identify a third-party with whom they conducted a voice communication (i.e. phone call) at a geolocation at a particular point in time, an event or landmark visited at the geolocation a particular point in time, or a weather condition or noise pollution experienced at the geolocation a particular point in time. At block 212, the LIA system 102 may receive, from the second client device 204, a response to the subset of authentication challenges. In doing so, the LIA system 102 may identify correct responses to each authentication challenge. Each correct response may be assigned an assurance score that is based on the authentication challenge, and an aggregate assurance score may be calculated as the sum of assurance scores associated with individual correct responses.

At block 214, the LIA system 102 may determine whether to authorize or deny the second client device 204 with access to a set of service features associated with the authentication request. In one example, the LIA system 102 may authorize access to the set of service features based on the aggregate assurance score being greater than or equal to a predetermined assurance threshold. In contrast, the LIA system 102 may deny access to the set of service features based on the aggregate assurance score being less than the predetermined assurance threshold.

Figure 3:
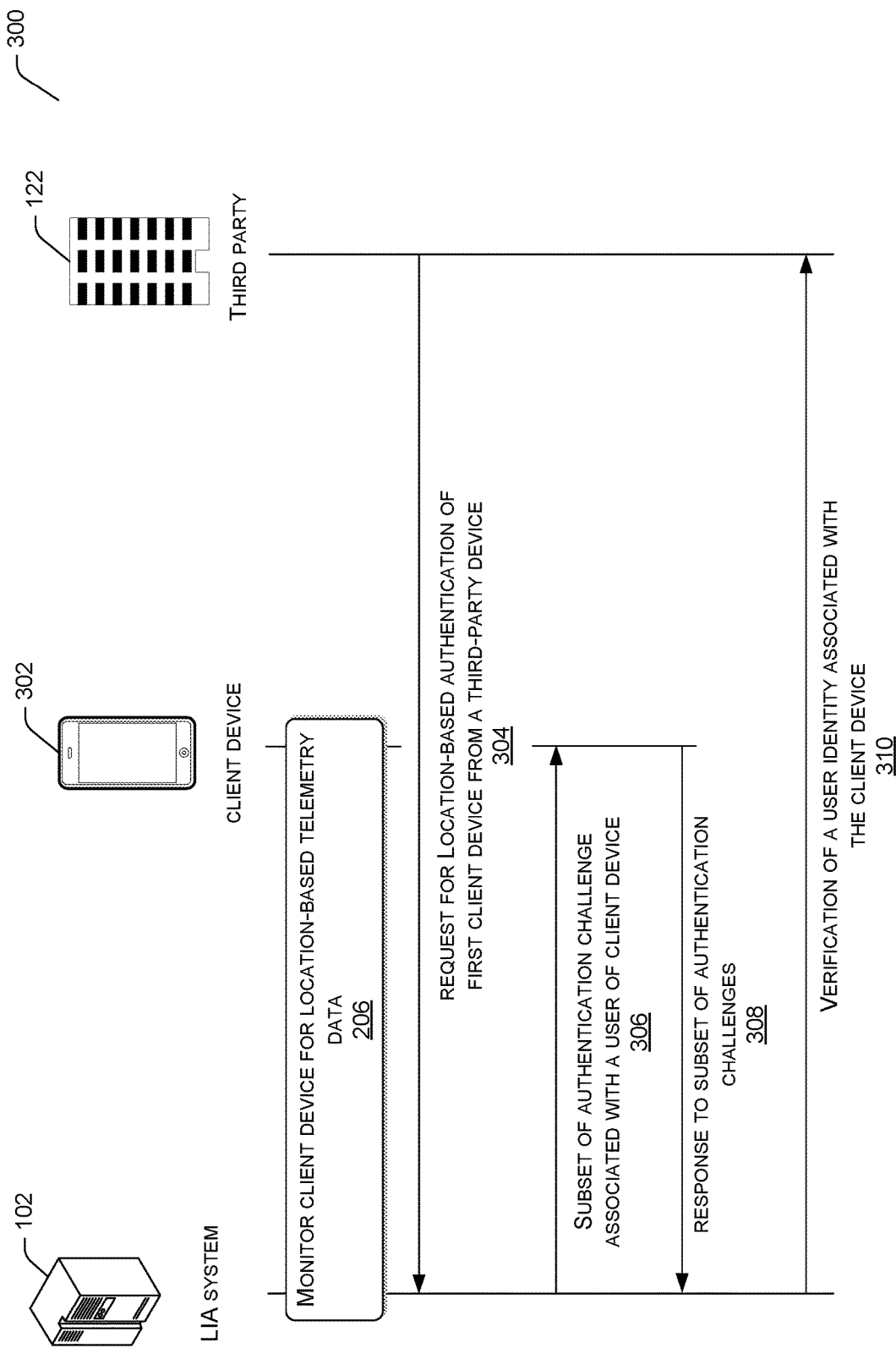
FIG. 3 illustrates a block diagram of a process for an LIA system to authenticate a user identity associated with a first client device, as requested by a third-party.

FIG. 3 illustrates a block diagram of a process for an LIA system 102 to authenticate a user identity associated with a first client device 202, as requested by a third-party 122. By way of example, the third-party 122 may correspond to a financial institution. In this process, a user associated with the first client device 202 may be attempting to withdraw funds from an ATM using an authorized card. The financial institution may recognize the authorized card and an association between the authorized card and the telecommunications network 104 that operates the LIA system 102. The client device 302 may correspond to one of client device(s) 112(1) or the first client device 202.

The process described in FIG. 3 includes various details relating to the LIA system 102 that were previously described with reference to FIG. 2. As such, for brevity and ease of description, various details relating to an operation of the LIA system 102 have been omitted herein to the extent that the same or similar details have been provided with reference to FIG. 2.

At block 304, the LIA system 102 may receive an authentication request, from a third-party 122. The authentication request may relate to accessing a set of service features associated with the third-party 122. Continuing with the previous example, the set of service features may relate to performing a transaction at a financial institution.

The authentication request may further identify the user that is the subject of the authentication request. The user may be identified by an authorized card used to perform the transaction at the financial institution, or entry of an identifier, such as a name, social security number, etc.

At block 306, the LIA system 102 may identify the user that is the subject of the authorization request, and in doing so, transmit a subset of authentication challenges to a client device 302 associated with the user. In an alternative embodiment, the subset of authentication challenges may be transmitted to a third-party device associated with the third-party 122, to which the user of the first client device(s) 112 has access. An example of the third-party device may include an ATM of a financial institution (i.e. third-party).

At block 308, the LIA system 102 may receive, from the client device 302 or a third-party device, a response to the subset of authentication challenges. In doing so, the LIA system 102 may identify correct responses to each authentication challenge and generate a corresponding aggregate assurance score based on the sum of assurance scores associated with individual correct responses. Note that each authentication challenge is assigned an assurance score based on the complexity of the authentication challenge. A correct response to the authentication challenge causes the corresponding assurance score to be part of the aggregate assurance score. In some examples, if a negative assurance score is associated with an incorrect response to an authentication challenge, the negative assurance score may also be included as part of an aggregate assurance score.

At block 310, the LIA system 102 may verify the identity of the user associated with the client device 302. In one example, the LIA system 102 may determine that the aggregate assurance score is greater than or equal to a predetermined assurance threshold, and accordingly transmit a notification to the third-party 122 indicating that the identity of the user has been verified. The third-party 122 may then act to authorize access to the set of third-party service features (i.e. perform a financial transaction) based on the user's verified identity.

In another example, the LIA system 102 may determine that the aggregate assurance score is less than the predetermined assurance threshold and accordingly transmit a notification to the third-party 122 indicating that the identity of the user has not been verified. The third-party 122 may then act to deny access to the set of third-party service features (i.e. performing a financial transaction) based on the lack of user identity verification.

Figure 4:
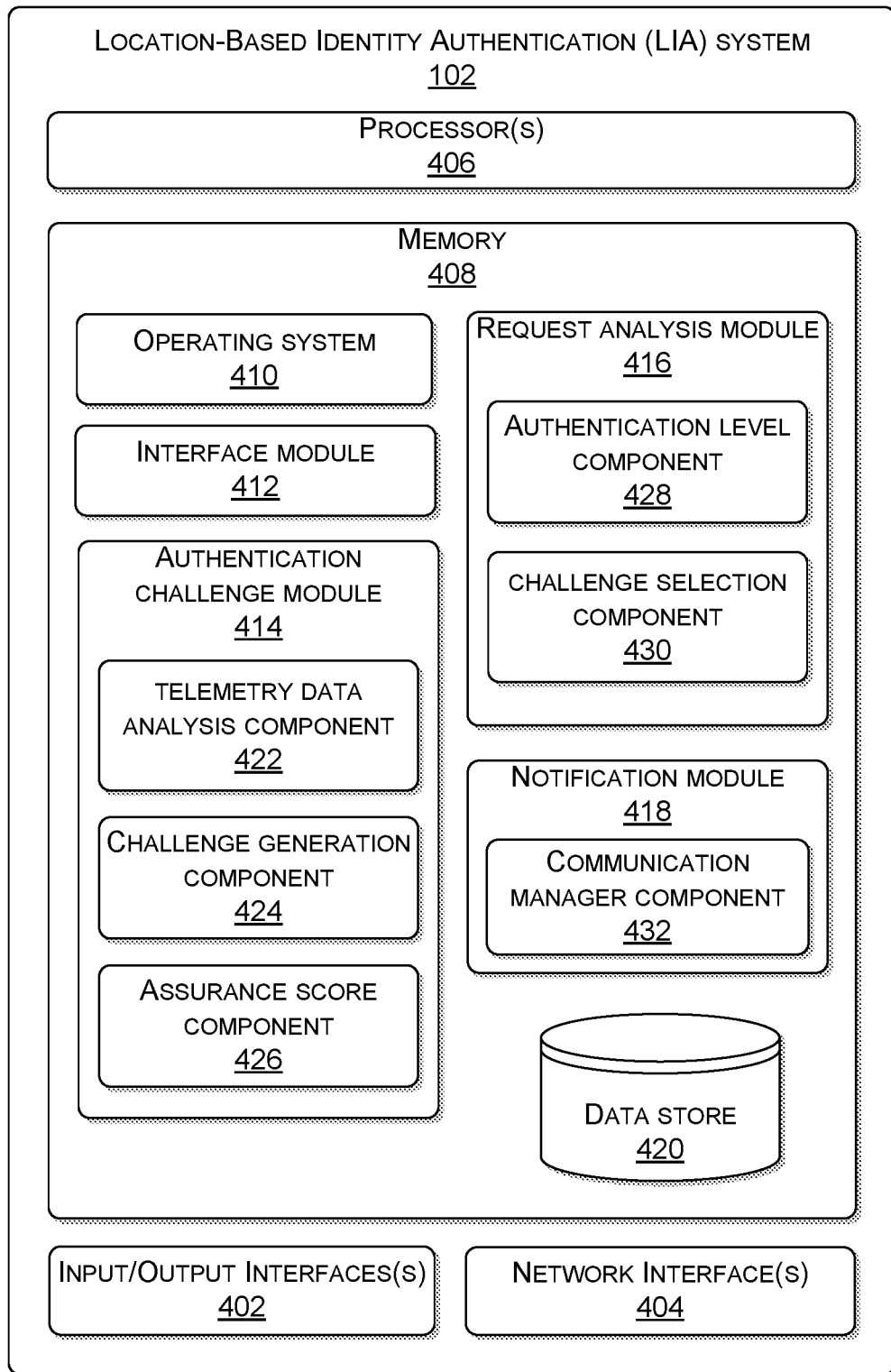
FIG. 4 illustrates a block diagram of various components of an LIA system.

FIG. 4 illustrates a block diagram of various components of a Location-based identity authentication (LIA) system. The LIA system may be configured to generate authentication challenges intended to verify a user identity associated with a client device. The LIA system may generate the authentication challenges based on location-based telemetry data captured unobtrusively from a client device over a predetermined time interval.

The LIA system 102 may include input/output interface(s) 402. The input/output interface(s) 402 may include any type of output interface known in the art, such as a display (e.g. a liquid crystal display), speakers, a vibrating mechanism, or a tactile feedback mechanism. Input/output interface(s) 402 also include ports for one or more peripheral devices, such as headphones, peripheral speakers, or a peripheral display. Further, the input/output interface(s) 402 may further include a camera, a microphone, a keyboard/keypad, or a touch-sensitive display. A keyboard/keypad may be a push-button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the LIA system 102 may include network interface(s) 404. The network interface(s) 404 may include any sort of transceiver known in the art. For example, the network interface(s) 404 may include a radio transceiver that performs the function of transmitting and receiving radio frequency communications via an antenna. In addition, the network interface(s) 404 may also include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 404 may include wired communication components, such as an Ethernet port or a Universal Serial Bus (USB).

Further, the LIA system 102 may include one or more processor(s) 406 that are operably connected to memory 408. In at least one example, the one or more processor(s) 406 may be a central processing unit(s) (CPU), graphics processing unit(s) (GPU), or both a CPU and GPU or any other sort of processing unit(s). Each of the one or more processor(s) 406 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 406 may also be responsible for executing all computer applications stored in the memory, which can be associated with common types of volatile (RAM) and/or non-volatile (ROM) memory.

In some examples, memory 408 may include system memory, which may be volatile (such as RAM), non-volatile (such as ROM, flash memory, etc.) or some combination of the two. The memory may also include additional data storage devices (removable and/or non-removable) such as, for example, magnetic disks, optical disks, or tape.

The memory 408 may further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 408 may include an operating system 410, a interface module 412, an authentication challenge module 414, a request analysis module 416, a notification module 418, and a data store 420. The operating system 410 may be any operating system capable of managing computer hardware and software resources. The operating system 410 may include an interface layer that enables applications to interface with the input/output interface(s) 402 and the network interface(s) 404.

The interface module 412 may be configured interact with a location-based telemetry application that resides on a client device to retrieve location-based telemetry data. In some examples, the interface module 412 may poll location-based telemetry data on a continuous basis or predetermined schedule. The predetermined schedule may correspond to a time interval of 30 minutes, one hour, or six hours. Any time interval is possible. In some examples, the interface module 412 may be configured to interact with the location-based telemetry application to identify a selection of geolocations upon which form the basis of the authentication challenges. Thus, the authentication challenges may be configured based on the selection of geolocations received by the interface module 412. In some examples, also, the interface module 412 may be configured to receive a selection of geolocations that are not to be used to generate authentication challenges. In other words, a client may proactively generate a blacklist of geolocations that are not to be used in generating authentication challenges.

Moreover, the interface module 412 may be further configured to receive a request for authentication from a second client device that relates to authenticating an identity of a client associated with a first client device. Further, the interface module 412 may prompt the first client device to select a specific geolocation from which authentication challenges are to be derived and presented. In doing so, the authentication challenges may be generated based on the prompted selection from the first client device. In other examples, the authentication challenges may be generated independent of a specific geolocation selection by the first client device.

The authentication challenge module 414 may further include a telemetry data analysis component 422, a challenge generation component 424, and an assurance score component 426. The telemetry data analysis component 422 may be configured to interact with the interface module 412 to retrieve location-based telemetry data from a client device. The telemetry data analysis component 422 may use one or more trained machine-learning algorithms to analyze the location-based telemetry data and infer a context associated with the visit. For example, the telemetry data may include a geolocation from a GPS sensor of the client device along with calendar data from a third-party calendar application that resides on the client device. In this example, the telemetry data analysis component 422 may infer that the context of visit relates to a schedule appointment.

The challenge generation component 424 may generate authentication challenges for delivery to a second client device that requests authentication of a client identity associated with a first client device. The challenge generation component 424 may use one or more trained machine-learning algorithms to generate the authentication challenges based on the analysis of the telemetry data analysis component 422 and the location-based telemetry data, itself. The challenge generation component 424 may further determine a complexity of individual authentication challenges, and in doing so assign each individual authentication challenge, an assurance score. The complexity of an authentication challenge is measured by the likelihood that a third-party with only a cursory familiarity of a client, may guess a correct response. Complexity may increase with authentication challenges that are based on geolocations that are infrequently visited by a client. Further, complexity may increase based on the level of detail requested by the authentication challenge.

For example, consider location-based telemetry data that includes expense data from a third-party financial tracking application that resides on a client device. In this example, the telemetry data analysis component 422 may determine a client's expenditure at a geolocation. The telemetry data analysis component 422 may further infer that the client was at a lunch meeting with another person (i.e. based on geolocation data and third-party calendar data), and if the client paid for lunch (i.e. based on the expense data). Accordingly, the challenge generation component 424 may generate a complex authentication challenge that asks "Who paid for lunch and how much did you pay?"

The assurance score component 426 may be configured to generate assurance scores for individual authentication challenges, based on the complexity of each authentication challenge. In one example, the assurance score may be configured as a binary measure of correct and incorrect responses. A correct response may correspond to an assurance score of one and an incorrect response may correspond to a null or negative assurance score. In another example, the assurance score for each correct response may vary (i.e. 0 to 10, or A to F) based on the complexity of question/response. For example, an authentication challenge with a low-level of complexity, such as, "where were you yesterday?" may have an assurance score between one and three. A more complex authentication challenge with a medium-level of complexity, such as, "who were you with yesterday and where?" may have an assurance score between four and six. An authentication challenge with a high-level of complexity, such as "where were you yesterday at noon and what did you buy at that location?" may have an assurance score between seven and ten.

The request analysis module 416 may further include an authentication level component 428 and a challenge selection component 430. The authentication level component 428 may analyze a request for authentication of a client identity received at the interface module 412. In doing so, the authentication level component 428 may determine the authentication level associated with the request. For example, if the authentication request is associated with a request that may access personally-identifiable information, such as financial data, the authentication level may be higher than an authentication request associated with gaming application that lacks access to personally-identifiable information. The authentication level may be alpha-numeric (i.e. 0 to 10, or A to F), descriptive, (i.e. low, medium, or high), based on color (i.e. red, yellow, or green), or any other suitable rating scale. A high authentication level (i.e. 7 to 10, high, or red) may reflect an authentication request that is associated with access to proprietary data or personally-identifiable data, such as financial account information and/or so forth. A medium authentication level (i.e. 4 to 6, medium, or yellow) may reflect an authentication request that is associated with access to personally identifiable information that is inconclusively protected under privacy terms and conditions. A low authentication level (i.e. 1 to 3, low, or green) may reflect an authentication request that is not associated with proprietary data or personally-identifiable data. Further, the authentication level component 428 may correlate each authentication level with a predetermined assurance threshold. The predetermined assurance threshold may correspond, quantitatively, to the authentication level. For example, an authentication level of ten may correspond to a predetermined assurance threshold of ten.

The challenge selection component 430 may be configured to select one or more authentication challenges of varying complexity based on the assurance score associated with the individual authentication challenges and the predetermined assurance threshold associated with the access request. For example, consider a second client device that requests authentication of a client identity associated with a first client device. In this example, the second client device may request authentication for access to financial data (i.e. second client device may be a financial institution). In this example, the authentication level component 428 may indicate that the corresponding authentication level is high, and assign an authentication level of ten. Accordingly, the predetermined assurance threshold may be set as ten. Therefore, the challenge selection component 430 may select one or more authentication challenges that, in aggregate, have assurance scores that are equal to or greater than the predetermined assurance threshold, which in this example, is ten.

The notification module 418 may further include a communication manager component 432 that is configured to facilitate the transmission of one or more notifications to client devices. The notifications may include a subset of authentication challenges, an indication of whether a user identity has been verified, an indication whether access to a set of service features has been granted or denied based on a verification of a user identity.

The data store 420 may include a repository of authentication challenges along with corresponding assurance scores, a repository of authentication levels and corresponding predetermined assurance thresholds associated with various access requests, and historical instances of location-based telemetry data retrieved from one or more client device(s) servided by the LIA system 102.

Figure 5:
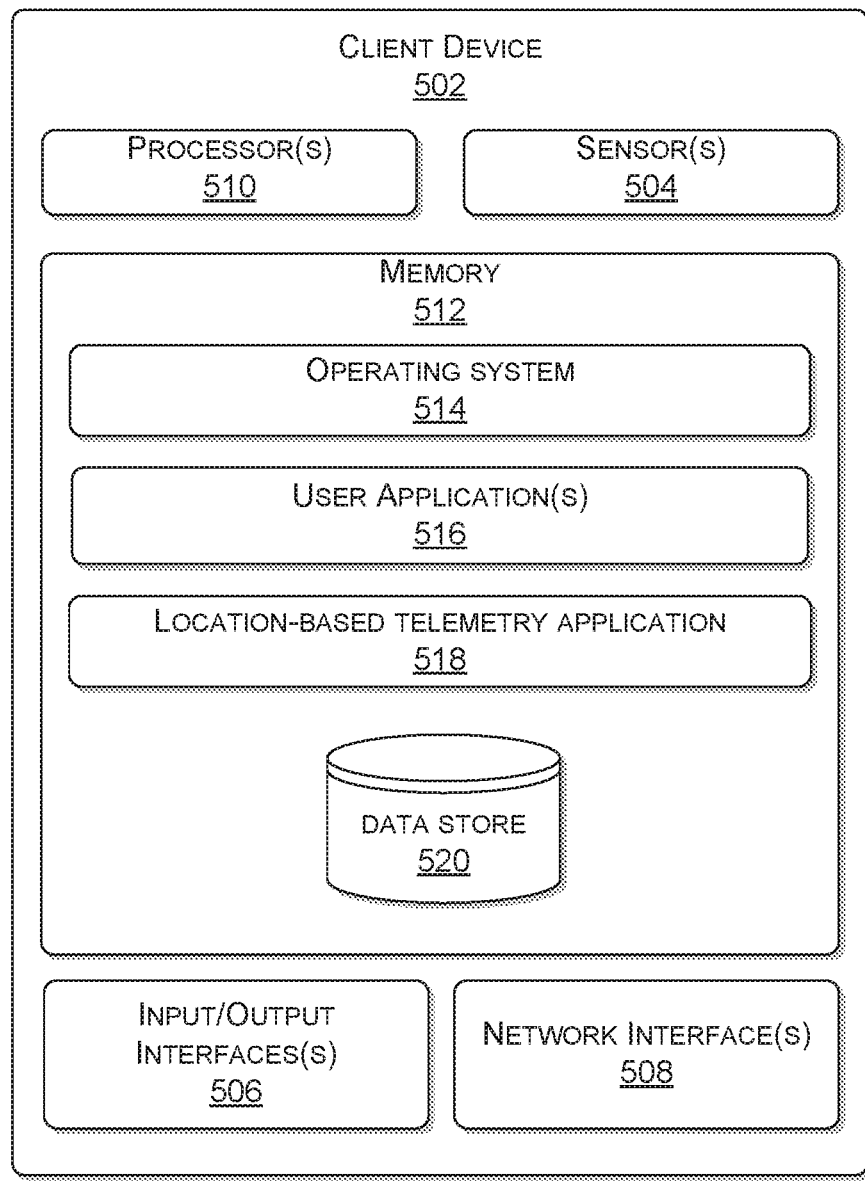
FIG. 5 illustrates a block diagram of various components of a client device that is configured to execute a location-based telemetry data application.

FIG. 5 illustrates a block diagram of various components of a client device 502 that is configured to execute a location-based telemetry data application. In various examples, the LIA system may interact with the location-based telemetry data application that resides on the client device to capture telemetry data for generating authentication challenges. The client device 502 may correspond to one of client device(s) 112, the first client device 202, the second client device 204, and client device 302.

In the illustrated example, the client device 502 may include sensor(s) 504. The sensor(s) 504 may capture sensor data that is used to generate the location-based telemetry data. The sensor(s) 504 may include accelerometers, proximity sensors, gyroscopes, and a Global Positioning System (GPS) sensor. The accelerometers and proximity sensors may generate sensor data to determine a motion of the client device 502. The gyroscope sensors may generate sensor data to determine an orientation of the client device 502. The GPS sensor may generate sensor data to determine a geo-location of the client device 502.

In the illustrated example, the client device 502 may include input/output interface(s) 506 and network interface(s) 508. The input/output interface(s) 506 may be similar to the input/output interface(s) 402, and the network interface(s) 508 may be similar to the network interface(s) 404.

Further, the client device 502 may include one or more processor(s) 510 that are operably connected to memory 512. The one or more processor(s) 510 may be similar to the one or more processor(s) 406, and the memory 512 may be similar to the memory 408.

In the illustrated example, the memory 512 may include an operating system 514, user application(s) 516, the location-based telemetry application 518, and a data store 520. The operating system 514 may include an interface layer that enables the user application(s) 516 and location-based telemetry application 518 to interface with the input/output interface(s) 502 and the network interface(s) 504.

The user application(s) 516 may include any application executable via the client device 502. The user application(s) 516 may reside on the client device 502 or may reside on a separate server that is remotely accessible by the client device 502. By way of example, user application(s) 516 may include a weather application, an events application, a calendar application, a contacts application, and/or so forth.

Figure 6:
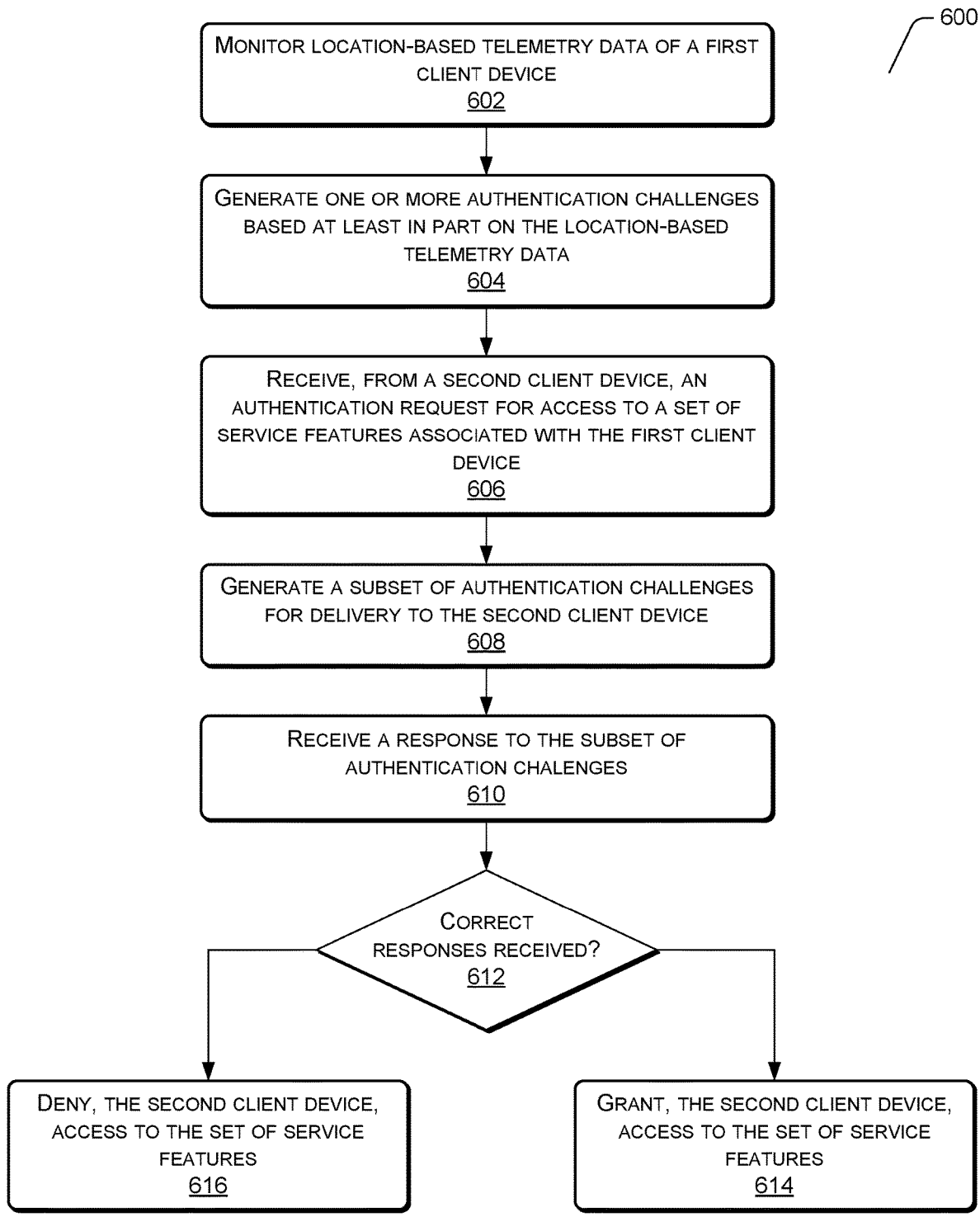
FIG. 6 presents a process that relates to operations of the Location-based identity authentication system.

FIG. 6 presents process 600 that relates to operations of the Location-based identity authentication system. Process 600 illustrates a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, process 600 is described with reference to the computing environment 100 of FIG. 1.

FIG. 6 illustrates a process for generating authentication challenges to verify a user identity associated with a client device. In the illustrated example, the LIA system may be configured to capture location-based telemetry that is associated with the client device, and in doing so, develop authentication challenges that are based on atypical data associated with a user of the client device.

At 602, the LIA system may monitor a first client device to capture location-based telemetry data associated with a first client device. Location-based telemetry data may be captured from sensors of the client device or third-party applications that reside on the client device. In some examples, the LIA system may prompt the first client device, via the location-based telemetry application, to select one or more geolocations that form the basis for generating authentication challenges. Alternately, the location-based telemetry application may forgo a prompt the first client device, and instead, unobtrusively generate a set of authentication challenges based on geolocations that are frequently, and/or infrequently visited by the first client device.

At 604, the LIA system may use one or more trained machine-learning algorithms to generate authentication challenges based at least in part on the location-based telemetry data. In one example, a first authentication challenge may ask a client to drop a pin to mark their location at a past time of day or day of the week. A second authentication challenge may prompt the client to input a narrative that best describes the purpose of a visit (i.e. attend an event, meet another individual) to a geolocation at a particular time and on a particular day of the week. A third authentication challenge may prompt the client to identify multimedia data (i.e. a photo, video, or audio) captured at a geolocation at a particular time and on a particular day. The LIA system may use any permutation or combination of location-based telemetry data to generate authentication challenges.

In various examples, an authentication challenge may present a client with a plurality of selectable options, whereby only one option includes the correct response. Alternatively, an authentication challenge may request the client to upload a text response, narrate an audio response, or upload multimedia data (i.e. a photo, video, or audio) associated with an authentication challenge.

The one or more machine learning algorithms may include but are not limited to algorithms such as supervised learning, unsupervised learning, semi-supervised learning, naive Bayes, Bayesian networks decision trees, neural networks, fuzzy logic models, multiclass decision forest, and/or probabilistic classification.

The LIA system may employ one or more trained machine-learning algorithms to determine the complexity of individual authentication challenges, and in doing so, assign each individual authentication challenge with an assurance score. Each correct response may receive a positive assurance score and each incorrect response, a null or negative assurance score.

In one example, an assurance score may be configured as a binary measure of correct and incorrect responses. In another example, the assurance score for each correct response may vary (i.e. 0 to 10, or A to F) based on the complexity of question/response. Any suitable scale may be used. By way of example, an authentication challenge that prompts a user to input a correct response may have a higher assurance score relative to an authentication challenge that presents a user with selectable options from which the user may select a correct response. In another example, an authentication challenge that prompts a user to upload text, audio, or multimedia data captured at an earlier point in time as a response may have a higher assurance score relative to an authentication challenge that requests the user to describe the purpose for a past visit to a geolocation.

At 606, the LIA system may receive, from a second client device, an authentication request for access to a set of service features associated with the first client device. The service features may relate to accessing a client account associated with a service provider, such as a telecommunications service provider. In this example, a user associated with the first client device may have lost their first client device and have attempted to authenticate their identity to the service provider using the second client device. More specifically, the set of service features may include an ability to send and receive text, audio, or data communications, along with client profile data and user application data that resides on the first client device.

At 608, the LIA system may generate a subset of authentication challenges for delivery to the second client device. In this process step, the LIA system may first analyze the authentication request received from the second client device and determine an authentication level associated with the authentication request. The authentication level may be alpha-numeric (i.e. 0 to 10, or A to F), descriptive, (i.e. low, medium, or high), based on color (i.e. red, yellow, or green), or any other suitable rating scale.

The LIA system may further correlate each authentication level with a corresponding predetermined assurance threshold. The predetermined assurance threshold may be compared with calculated assurance scores to determine whether a user identity has been verified.

Further, the LIA system may select a number of authentication challenges to include within the subset of authentication challenges. The number of authentication challenges selected may be based at least in part on the complexity of each authentication challenge and the authentication level associated with the authentication request.

At 610, the LIA system may receive a response to the subset of authentication challenges. For each correct response to an authentication challenge, the LIA system may assign a positive assurance score that had been predetermined for the authentication challenge. Similarly, for each incorrect response, the LIA system may assign a predetermined null or negative assurance score. The LIA system may aggregate the assurance scores to generate an aggregate assurance score.

At 612, the LIA system may determine whether the aggregate assurance score is greater than or equal to the predetermined assurance threshold. If the aggregate assurance score is greater than or equal to the predetermined assurance threshold, the LIA system may infer that the user identity associated with the first client device has been verified. In contrast, if the aggregate assurance score is less than the predetermined assurance threshold, the LIA system may infer that the user identity has not been verified.

At 614, the LIA system may determine that the aggregate assurance score is greater than or equal to the predetermined assurance threshold, and therefore infer that the user identity associated with the first client device has been verified. Accordingly, the LIA system may grant the second client device access to the set of service features.

At 616, the LIA system may determine that the aggregate assurance score is less than the predetermined assurance threshold, and therefore infer that the user identity associated with the first client device has not been verified. Accordingly, the LIA system may deny the second client device access to the set of service features.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A computer-implemented method, comprising:
under one or more processors:
monitoring, at a first client device, location-based telemetry data associated with the first client device over a predetermined time interval;
generating one or more authentication challenges and corresponding correct responses to the one or more authentication challenges, based at least in part on the location-based telemetry data, the one or more authentication challenges being configured to verify a user identity associated with the first client device;
receiving, from a second client device that is associated with a third-party that is different from a user associated with the first client device, an authentication request for access to a set of service features associated with the third-party;
transmitting, to the second client device, a subset of authentication challenges from the one or more authentication challenges;
receiving, from the second client device, authentication responses that correspond to the subset of authentication challenges;
in response to determining that the authentication responses correspond to correct responses for the subset of authentication challenges, verifying a user identity associated with the first client device; and
in response to verifying the user identity, transmitting a message to the second client device indicating that the user identity associated with the first client device has been verified.

2. The computer-implemented method of claim 1, further comprising:
granting the second client device with access to the service features associated with the first client device, based at least in part on verifying the user identity associated with the first client device.

3. The computer-implemented method of claim 1, further comprising:
analyzing the authentication request to determine an authentication level associated with the set of service features, the authentication level indicating a degree of proprietary data accessible via the set of service features;
determining a complexity of individual authentication challenges within the set of authentication challenges; and
selecting the subset of authentication challenges from the one or more authentication challenges, based at least in part on the complexity of authentication challenges.

4. The computer-implemented method of claim 3, further comprising:
generating a predetermined assurance threshold that indicates whether the user identity is verified for access to the set of service features, based at least in part on the authentication level;
assigning, individual authentication challenges of the subset of authentication challenges, individual assurance scores that corresponds to a correct response, based at least in part on the complexity of the individual authentication challenges; and determining a number of authentication challenges to include within the subset of authentication challenges, based at least in part on the individual assurance scores and the predetermined assurance threshold, and wherein, selecting the subset of authentication challenges from the one or more authentication challenges is further based at least in part on the number of authentication challenges.

5. The computer-implemented method of claim 4, further comprising:

in response to receiving authentication responses that correspond to the subset of authentication challenges, determining an aggregate of the individual assurance scores for correct responses to the subset of authentication challenges, and wherein, verifying the user identity is based at least in part on the aggregate of the individual assurance scores being greater than or equal to the predetermined assurance threshold.

6. The computer-implemented method of claim 1, wherein the location-based telemetry data corresponds to a geolocation visited by the first client device at a particular time of day or day of week, and further comprising:

generating a map of a geographic region that includes the geolocation, and wherein at least one authentication challenge of the subset of authentication challenges includes prompting, via a user interface of the second client device, a response to identify the location on the map of the geographic region as a place visited at the particular time of day or the day of week.

7. The computer-implemented method of claim 1, further comprising:

determining a current location of the second client device based at least in part on the authentication request, and wherein at least one authentication challenge of the subset of authentication challenges is based at least in part on the current location.

8. The computer-implemented method of claim 1, wherein monitoring the location-based telemetry data at the first client device includes identifying a geolocation visited by the first client device within a predetermined time interval, the location-based telemetry data further including an event that occurs at the geolocation at a same point in time as a visit by the first client device, a weather condition associated with the geolocation, a landmark associated with the geolocation, or a calendar event associated with the first client device that occurs at the geolocation, and wherein, the one or more authentication challenges are based at least in part on the event, the weather condition, the landmark, or the calendar event.

9. The computer-implemented method of claim 1, wherein the location-based telemetry data further includes sensor data associated with a motion of the client device at a geolocation at a particular point in time, and further comprising:

determining a motion of the client device at the geolocation at the particular point in time, and wherein at least one authentication challenge of the subset of authentication challenges includes prompting, via a user interface of the second client device, a response to describe the motion of the client device at the geolocation at the particular point in time.

10. The computer-implemented method of claim 1, wherein the location-based telemetry data corresponds to a transaction for goods or services conducted at a geolocation at a particular point in time, and wherein at least one authentication challenge of the subset of authentication challenges includes prompting, via a user interface of the second client device, a response to describe the transaction for goods or services.

11. The computer-implemented method of claim 1, wherein the first client device is associated with a telecommunications service account, and wherein the authentication request to access service features corresponds to access to the telecommunications service account.

12. The computer-implemented method of claim 1, wherein the third-party is a financial institution.

13. A system, comprising:

one or more processors;

memory coupled to the one or more processors, the memory including one or more modules that are executable by the processors to:

monitor, at a first client device, location-based telemetry data associated with the first client device over a predetermined time interval;

generate a set of authentication challenges to verify a user identity associated with the first client device;

assign individual authentication challenges of the set of authentication challenges with individual assurance scores that culminate from correct responses to the individual authentication challenges;

receive, from a second client device, an authentication request for access to a set of service features accessible by the first client device or a user associated with the first client device;

analyze the authentication request to determine an authentication level associated with the set of service features;

select a number of authentication challenges from the set of authentication challenges for inclusion within a subset of authentication challenges based at least in part on corresponding individual assurance scores of the number of authentication challenges in the subset, such that an aggregation of the corresponding individual assurance scores is equal to or greater than a value of a predetermined assurance threshold that corresponds to the authentication level;

transmit the subset of authentication challenges to the second client device; and verify a user identity associated with the first client device, based at least in part on receipt of a response to the subset of authentication challenges.

14. The system of claim 13, wherein the one or modules are further executable by the one or more processors to:

analyze the response to the subset of authentication challenges to identify one or more correct responses; and aggregate the individual assurance scores associated with the one or more correct responses, and wherein to verify the user identity associated with the first client device is based at least in part on the aggregated of the individual assurance scores being greater than or equal to the predetermined assurance threshold.

15. The system of claim 13, wherein the set of service features is associated with a third-party that is different from a user of the first client device.

16. The system of claim 13, wherein the one or more modules are further executable by the one or more processors to:

determine a complexity of individual authentication challenges within the set of authentication challenges, and wherein, to select the number of authentication challenges for inclusion within the subset of authentication challenges is further based at least in part the complexity of individual authentication challenges.

17. One or more non-transitory computer-readable media storing computer-executable instructions that, when executed on one or more processors, cause the one or more processors to perform acts comprising:
    monitoring, at a first client device, location-based telemetry data associated with the first client device over a predetermined time interval;
    generating a set of authentication challenges to verify a user identity associated with the first client device;
    receiving, from a second client device, an authentication request for access to a set of service features accessible by the first client device or a user associated with the first client device;
    determining a current location of the second client device based at least in part on the authentication request;
    analyzing the authentication request to determine an authentication level associated with the set of service features;
    selecting a number of authentication challenges based at least in part on the authentication level;
    generating a subset of authentication challenges for delivery to the second client device, based at least in part on the number of authentication challenges, wherein at least one authentication challenge of the subset of authentication challenges is based at least in part on the current location; and
    verifying an identity of the first client device, based at least in part on receipt of a response to the subset of authentication challenges.

18. The one or more non-transitory computer-readable media of claim 17, further comprising:
    assigning individual authentication challenges of the set of authentication challenges with individual assurance scores that culminate from correct responses to the individual authentication challenges, and
    wherein, selecting the number of authentication challenges is further based at least in part on the individual authentication challenges.

19. The one or more non-transitory computer-readable media of claim 18, further comprising:
    determining a complexity of individual authentication challenges within the set of authentication challenges, and
    wherein the individual assurance scores that culminate from correct responses to the individual authentication challenges is based at least in part on the complexity of the individual authentication challenges.

20. The one or more non-transitory computer-readable media of claim 17, further comprising:
    granting the second client device with access to the service features associated with the first client device, based at least in part on verifying the user identity associated with the first client device.

* * * * *